(12) United States Patent
Nishida

(10) Patent No.: US 11,543,727 B2
(45) Date of Patent: Jan. 3, 2023

(54) VEHICULAR DISPLAY AND VEHICLE INCLUDING THE SAME

(71) Applicant: TOYOTA JIDOSHA KABUSHIKI KAISHA, Toyota (JP)

(72) Inventor: Ai Nishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 428 days.

(21) Appl. No.: 16/823,985

(22) Filed: Mar. 19, 2020

(65) Prior Publication Data

US 2020/0310215 A1 Oct. 1, 2020

(30) Foreign Application Priority Data

Mar. 29, 2019 (JP) .............................. JP2019-067199

(51) Int. Cl.
  *G02F 1/16755* (2019.01)
  *G02F 1/167* (2019.01)
  *B60Q 1/50* (2006.01)

(52) U.S. Cl.
  CPC .......... *G02F 1/16755* (2019.01); *G02F 1/167* (2013.01); *B60Q 1/50* (2013.01)

(58) Field of Classification Search
  CPC .............................. G02F 1/16755; G02F 1/167
  See application file for complete search history.

(56) References Cited

U.S. PATENT DOCUMENTS

| 2014/0340430 A1 | 11/2014 | Telfer et al. |
| 2015/0029418 A1 | 1/2015 | Ueda et al. |
| 2017/0287407 A1 | 10/2017 | Telfer et al. |
| 2018/0067373 A1* | 3/2018 | Kimura .................... G02F 1/167 |
| 2019/0164505 A1 | 5/2019 | Telfer et al. |
| 2019/0197927 A1 | 6/2019 | Matsuoka et al. |

FOREIGN PATENT DOCUMENTS

| JP | 2013-196039 A | 9/2013 |
| JP | 2015-025968 A | 2/2015 |
| JP | 2017-227907 A | 12/2017 |
| JP | 2018-41075 A | 3/2018 |
| JP | 6477856 B1 | 3/2019 |

OTHER PUBLICATIONS

"3M OneWay Vision Film 8170-P50;" 3M Scotchcal; 2015; pp. 1-2.

* cited by examiner

*Primary Examiner* — Dung T Nguyen

(74) *Attorney, Agent, or Firm* — Oliff PLC

(57) ABSTRACT

A vehicular display that ensures no cooped-up feeling is felt by an occupant providing limited visibility arranged on a transparent outer panel of a vehicle is an electronic paper that displays a video on a vehicle exterior. The electronic paper is provided with a plurality of hole portions to have a light transmission region through which a light is transmitted in the electronic paper. In a state where the electronic paper is viewed in a thickness direction, a hole occupancy as a ratio of an area of the plurality of hole portions to a whole area of the light transmission region falls within a range of 40% or more and 80% or less, and a maximum length that connects two points on a peripheral edge of each of the hole portions falls within a range of 0.5 mm or more and 8.0 mm or less.

5 Claims, 8 Drawing Sheets

VEHICULAR DISPLAY AND VEHICLE INCLUDING THE SAME

CROSS REFERENCE TO RELATED APPLICATIONS

The present application claims priority from Japanese patent application JP 2019-067199 filed on Mar. 29, 2019, the content of which is hereby incorporated by reference into this application.

BACKGROUND

Technical Field

The present disclosure relates to a vehicular display and a vehicle that includes the vehicular display.

Background Art

Conventionally, displays having an electronic paper have been used. As such a display, for example, JP 2017-227907 A proposes an electrophoretic electronic paper that includes a transparent electrode layer, a rear electrode layer, and a display medium layer formed of a plurality of microcapsules disposed therebetween. In the microcapsules, positively and negatively charged pigments are contained in a transparent dispersion medium. When a video is displayed on the display, the positively and negatively charged pigments are electrophoresed in the microcapsules by controlling the electrode polarity of the rear electrode layer that is in contact with each of the microcapsules to be a positive electrode or a negative electrode. This displays the video on the display via the transparent electrode layer.

SUMMARY

When the display presented in JP 2017-227907 A is disposed on a transparent outer panel, such as a vehicle side glass, it is assumed that the video of the electronic paper is displayed on a vehicle exterior. At this time, an occupant inside the vehicle cannot see outside the vehicle due to the display, and possibly feels a cooped-up feeling.

The present disclosure has been made in view of the above-described problem, and the present disclosure provides a vehicular display that ensures suppressing a cooped-up feeling felt by an occupant inside a vehicle while suppressing visibility inside the vehicle from outside the vehicle.

A vehicular display according to the present disclosure is a vehicular display arranged on a transparent outer panel of a vehicle. The vehicular display includes an electronic paper that displays a video on a vehicle exterior. The electronic paper is provided with a plurality of hole portions to have at least a light transmission region through which a light is transmitted in the electronic paper. In a state where the electronic paper is viewed in a thickness direction, a hole occupancy as a ratio of an area of the plurality of hole portions to a whole area of the light transmission region falls within a range of 40% or more and 80% or less, and a maximum length that connects two points on a peripheral edge of each of the hole portions falls within a range of 0.5 mm or more and 8.0 mm or less.

With the present disclosure, the electronic paper is provided with the plurality of hole portions to have the light transmission region through which the light is transmitted in the electronic paper, thereby ensuring visibility outside the vehicle from inside the vehicle via the hole portions in the light transmission region. On the other hand, while a video of the electronic paper can be displayed on the vehicle exterior, since a pedestrian and the like outside the vehicle are in positions away from the light transmission region of the electronic paper compared with an occupant inside the vehicle, the inside of the vehicle is difficult to see via the hole portions from the pedestrian and the like outside the vehicle. As the result, it is possible to suppress a cooped-up feeling felt by a person inside the vehicle while suppressing visibility inside the vehicle from outside the vehicle.

Here, for example, when the hole occupancy is less than 40% or when the maximum length is less than 0.5 mm, the outside of the vehicle is difficult to see from inside the vehicle. On the other hand, when the hole occupancy exceeds 80% or when the maximum length exceeds 8.0 mm, the inside of the vehicle is easy to see from outside the vehicle. Note that, it is only necessary that the hole portion in the present disclosure enable the light to be transmitted in the thickness direction of the electronic paper via the hole portion. For example, an aspect of the hole portion may be any aspect of a hole that is an opening formed in the electronic paper without passing through it, a through hole that passes through the electronic paper, or a hole internally formed without having an opening.

In some embodiments, a transparent member is disposed in the hole portion. This transparent member ensures securing strength of the electronic paper, and ensures suppressing a contortion of an image of a portion through which the light is transmitted.

In some embodiments, in a state of being viewed in the thickness direction, a clearance is formed between a wall surface that forms the hole portion and the transparent member. Providing the clearance between this transparent member and the wall surface that forms the hole portion ensures suppressing a deformation of the electronic paper caused by a thermal expansion difference between the electronic paper and the transparent member.

In some embodiments, the electronic paper has an adjacent region adjacent to the light transmission region, the hole portion is further formed in the adjacent region, and, as distancing away from the light transmission region, an occupancy of the hole portion in the adjacent region decreases. This aspect ensures making a boundary between the light transmission region and the adjacent region caused by the hole portion unnoticeable.

For example, while the light transmission region may be disposed on the whole surface of the electronic paper, in some embodiments, when a distance from a floor in a vehicle interior of the vehicle to a ceiling in the vehicle interior of the vehicle is H, the light transmission region at least includes a range at least from a height of ⅓×H to a height of ⅔×H with respect to the floor. With this aspect, the range from the height of ⅓×H to the height of ⅔×H with respect to the floor is close to a position of an eye line when an occupant inside the vehicle sees outside the vehicle. In view of this, while suppressing visibility inside the vehicle from outside the vehicle by causing at least such a range to serve as the light transmission region, the occupant inside the vehicle can easily see outside the vehicle, thereby ensuring a further suppressed cooped-up feeling.

In some embodiments, the light transmission region has a display region that corresponds to a shape of a character or a graphic, a hole occupancy of the display region differs from a hole occupancy of the light transmission region other than the display region. The hole occupancy of the display region thus differing from the hole occupancy of the light transmission region other than the display region ensures visually perceiving the character of the display region clearly from outside the vehicle by the light transmitted through the hole portion in the light transmission region from inside the vehicle, for example, in the night time.

The present disclosure ensures suppressing a cooped-up feeling felt by an occupant inside a vehicle while suppressing visibility inside the vehicle from outside the vehicle.

DETAILED DESCRIPTION

The following describes vehicular displays 10A to 10F according to an embodiment of the present disclosure in details based on the drawings FIG. 1 to FIG. 8C.

Figure 1:
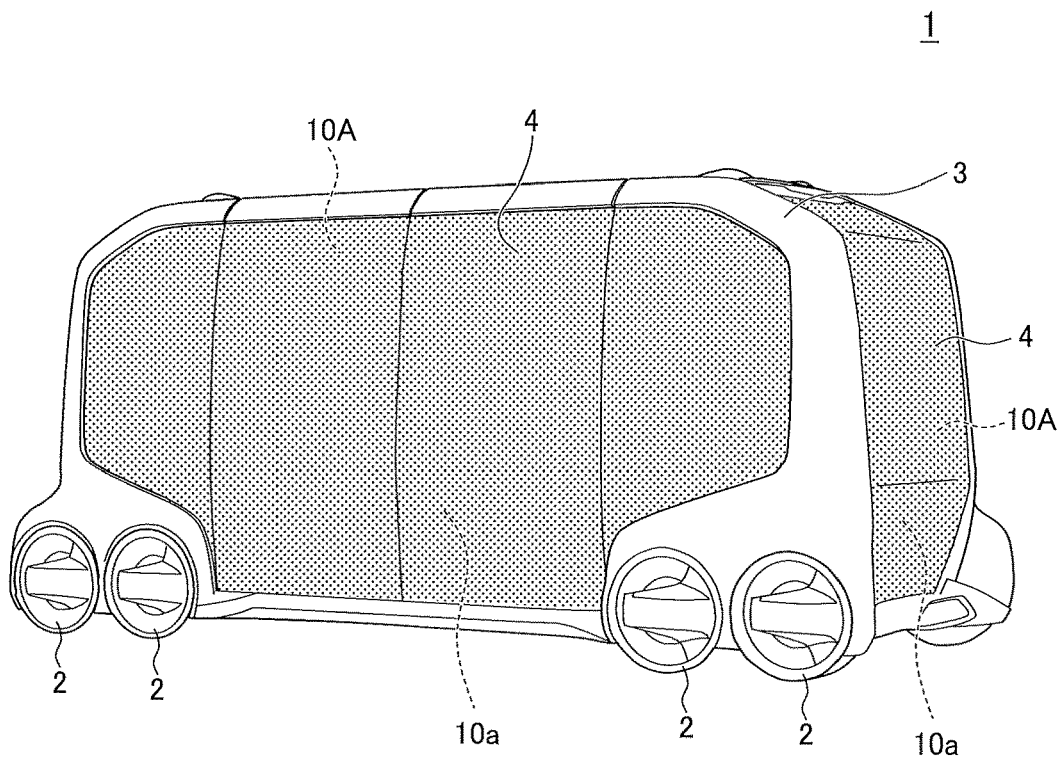
FIG. 1 is a perspective view of a vehicle including a vehicular display according to an embodiment of the disclosure.
Figure 2:
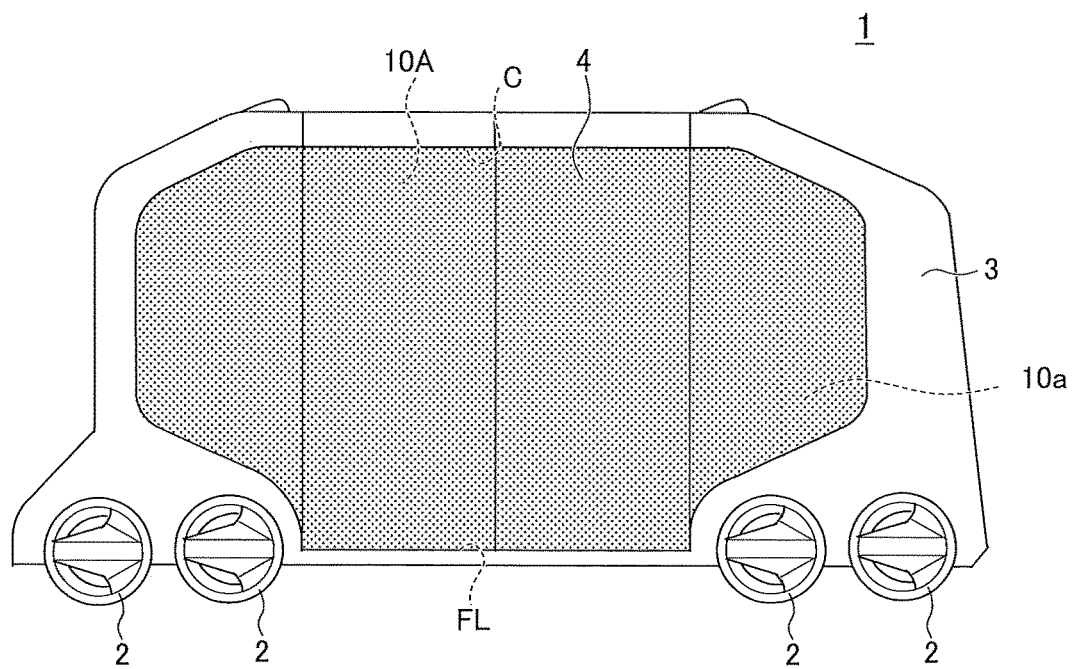
FIG. 2 is a side view of a vehicle illustrated in FIG. 1.

As illustrated in FIG. 1 and FIG. 2, the vehicular display (hereinafter referred to as the display) 10A according to the embodiment is installed on a vehicle 1. The vehicle 1 includes a driving device (not illustrated), such as a motor, that drives with an electric power from a power supply unit (not illustrated) and a control device (not illustrated) that controls the driving device. The vehicle 1 rotates wheels 2 with a power of the driving device to travel.

The vehicle 1 includes a vehicle main body 3 that corresponds to a frame and a transparent outer panel 4 that partitions a vehicle interior and a vehicle exterior. Materials of the outer panel 4 can include, for example, a transparent resin and a glass, and it is not specifically limited as long as the material has mechanical strength and weather resistance. The outer panel 4 is formed over a height from a floor FL to a ceiling C in the vehicle interior of the vehicle 1.

In the embodiment, the display 10A is attached on the outer panel 4 from a vehicle inner side so as to cover the whole surface of the outer panel 4, and is an electronic paper that displays a video on the vehicle exterior via the transparent outer panel 4. Accordingly, the display (electronic paper) 10A is disposed over the height from the floor FL to the ceiling C in the vehicle interior of the vehicle 1. Note that, while in the embodiment the display 10A is attached on the outer panel 4 from the vehicle inner side, the display 10A may be, for example, attached on the outer panel 4 from a vehicle outer side. Note that, since the display hereinafter means the same as the electronic paper, the same reference numeral 10A is designated in the drawings. The electronic paper 10A is electrically coupled to the above-described control device (not illustrated), and can display a video on the vehicle exterior by a control signal from the control device.

As illustrated in FIG. 3 to FIG. 5A, the electronic paper 10A has a light transmission region 10a through which the light is transmitted in the electronic paper 10A (specifically, in its thickness direction) by providing a plurality of hole portions 14. The plurality of hole portions 14 are formed in the light transmission region 10a. The light is transmitted in the thickness direction of the electronic paper 10A via these hole portions 14. In the embodiment, as described later, the plurality of hole portions 14 are formed so as to be uniformly dispersed in the whole electronic paper 10A. Therefore, the whole region of the electronic paper 10A serves as the light transmission region 10a.

The electronic paper 10A may employ any method including an electrophoresis method, an electrodeposition method, a movable film method, an electrochromic method, a twist ball method, a particle movement method, an electrowetting method, a thermal method, a magnetophoresis method, or the like, as long as the electronic paper 10A can display a video and be provided with the plurality of hole portions 14. Generally, since the electronic papers in these methods have a transparent electrode layer on its surface, it is only necessary that the hole portions can be formed in a display medium layer that directly displays a video and a rear electrode layer that sandwiches a transparent electrode layer with the display medium layer. When the rear electrode layer is transparent, the hole portions are not necessarily provided in this electrode layer. In the embodiment, the electronic paper 10A is an electronic paper in the electrophoresis method, and the detailed description will be given below.

As illustrated in FIG. 3 to FIG. 5A, the electronic paper 10A is a circuit substrate in which a protective layer 51 is formed on an electronic paper main body 10, and is flexible. The electronic paper main body 10 includes a transparent electrode layer (transparent conducting layer) 20 including electrodes (not illustrated) of, for example, Indium Tin Oxide (ITO) and a rear electrode layer 40 including lower electrodes (not illustrated). The protective layer 51 is a transparent layer and covers the rear electrode layer 40 from the vehicle inner side.

In the embodiment, a display medium layer 30 is disposed between the transparent electrode layer 20 and the rear electrode layer 40. The display medium layer 30 is a layer on which a plurality of microcapsules 31 are spread over so as to form the hole portions 14a. The microcapsules 31 are disposed on the transparent electrode layer 20 and the rear electrode layer 40, for example, via an adhesive agent. The microcapsules 31 may be disposed without using the adhesive agent as long as the microcapsules 31 are secured between the transparent electrode layer 20 and the rear electrode layer 40.

The microcapsule 31 is a spherical body having a diameter of several tens μm (for example, approximately 40 μm). Inside a transparent capsule main body 32, positively charged pigments 34 and negatively charged pigments 35 are contained together with a dispersion medium 33 (see FIG. 4). The pigment 34 is a white pigment and the pigment 35 is a black pigment. Note that, in the embodiment, the electronic paper 10A displays two colors of black and white. In the embodiment, it is only necessary that the different colored pigments are positively or negatively charged corresponding to its color. For example, the positively charged pigments may be magenta, cyan, and yellow pigments with different degrees of charging. This ensures the electronic paper 10A displaying a colored video. Such a display medium layer 30 can be formed by, for example, silk-screen-printing a paste material that includes the plurality of microcapsules 31. Note that, while in the embodiment the plurality of microcapsules 31 contain the dispersion medium 33 and the pigments 34, 35, for example, they may be contained in a plurality of transparent cells formed in one layer.

The transparent electrode layer 20 is a transparent layer formed on one surface of the electronic paper 10A, and includes a plurality of electrodes and a support layer that supports the plurality of electrodes (not illustrated). The transparent electrode layer 20 is arranged on the vehicle outer side as a side on which a video is displayed with respect to the display medium layer 30. In the embodiment, the transparent electrode layer 20 is attached on a surface on the vehicle inner side of the outer panel 4. Note that "transparent" in the embodiment may be 1% or less cloudiness (HAZE) in accordance to Japanese Industrial Standard K 7136.

Materials of the electrode of the transparent electrode layer 20 can specifically include a carbon nanotube, IZO, graphene, silver nanoparticles, a nanowire, a carbon nanoribbon, ITO, ZnO, TCO, and the like. Note that the material of the transparent electrode layer 20 is not specifically limited as long as a voltage can be applied on each of the microcapsules 31 between the electrodes of the transparent electrode layer 20 and the electrodes of the rear electrode layer 40 corresponding to a video to be displayed and the pigments 34, 35 of the display medium layer 30 can be visually perceived from a side of the transparent electrode layer 20.

The rear electrode layer 40 is a layer formed on the other surface of the electronic paper 10A, and includes a plurality of electrodes and a support layer that supports the plurality of electrodes (not illustrated). The material of the electrode of the rear electrode layer 40 is not specifically limited as long as the material has a conductive property, and, for example, metal, such as Au, Al, Ag, Ni, and Cu, a transparent conductor, such as ITO, $SnO_2$, and ZnO—Al, or a conductive paste made by mixing a conductive agent in a solvent or a synthetic resin binder can be included. The plurality of electrodes of the transparent electrode layer 20 and the rear electrode layer 40 are arranged in a matrix. Applying a voltage on the opposing electrodes of the transparent electrode layer 20 and the rear electrode layer 40 applies a voltage on the microcapsules 31 to cause the charged pigments 34, 35 in the microcapsules 31 to gather on any side of the transparent electrode layer 20 or the rear electrode layer 40.

Thus, a video of the electronic paper 10A can be displayed on the transparent electrode layer 20 side. Note that, in FIG. 4, polarities (positive pole or negative pole) of the respective electrodes of the rear electrode layer 40 are exemplarily illustrated, and the polarities of the respective electrodes are controlled corresponding to the video to be displayed.

Figure 3:
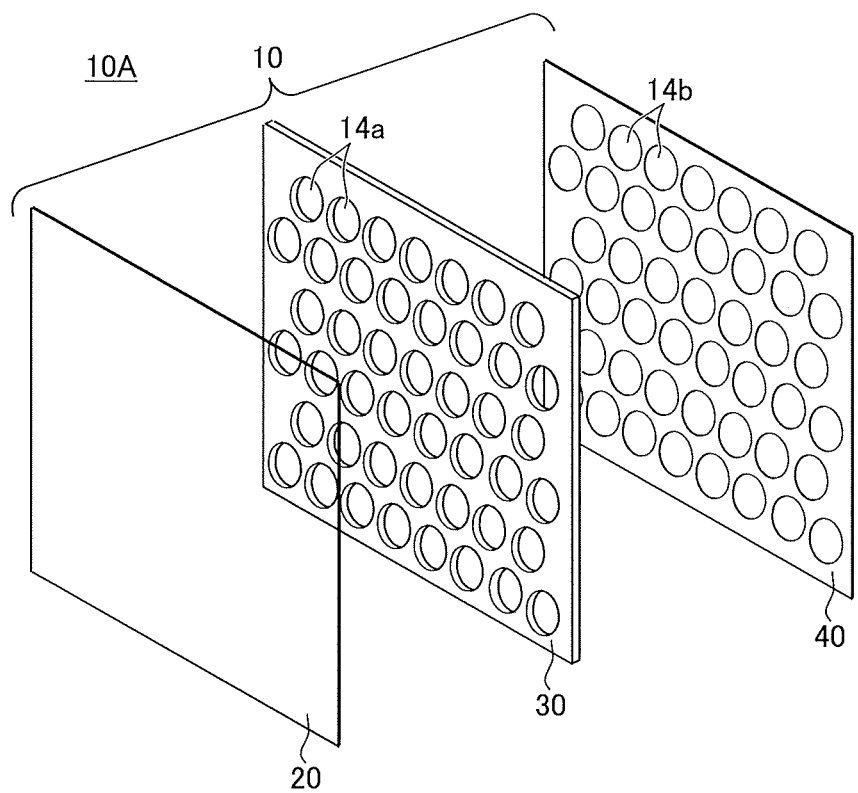
FIG. 3 is a schematic exploded perspective view of an electronic paper main body as the vehicular display in FIG. 2.

In the embodiment, as described above, the whole surface of the electronic paper 10A is the light transmission region 10a, and the plurality of hole portions 14 that transmits the light is formed in the electronic paper 10A. Specifically, in the embodiment, as illustrated in FIG. 3, a plurality of hole portions 14a, 14b are formed in the display medium layer 30 and the rear electrode layer 40. The plurality of hole portions 14a, 14b each have the same sized circular shape viewed in the thickness direction of the display medium layer 30 and the rear electrode layer 40. These hole portions 14a, 14b are formed to overlap in a state where the display medium layer 30 and the rear electrode layer 40 are laminated, to configure the hole portions 14 of the electronic paper 10A.

Figure 6A:
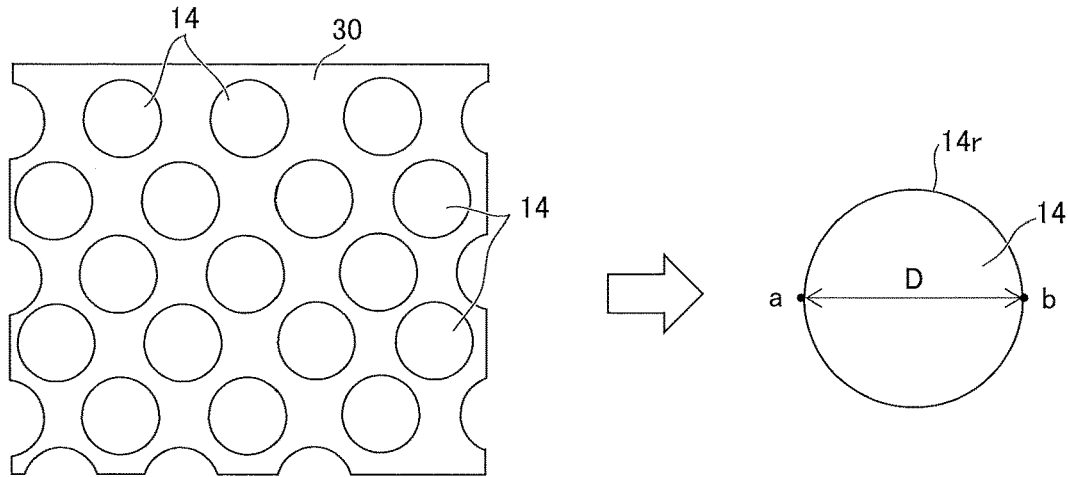
FIG. 6A is a schematic plan view for describing a shape of a hole portion of the electronic paper illustrated in FIG. 5A.

While the hole portions 14 of the electronic paper 10A are arranged in a stagger shape as illustrated in FIG. 6A, the arrangement of the hole portions 14 is not specifically limited as long as the following conditions are satisfied. The hole portions 14 have a hole occupancy as a ratio of an area of the plurality of hole portions 14 (area of all the hole portions 14) to the whole area of the light transmission region 10a (the whole area of the light transmission region 10a including all the hole portions 14) that falls within a range of 40% or more and 80% or less in a state where the electronic paper 10A is viewed in the thickness direction.

Furthermore, the maximum length (maximum distance) D that connects two points a and b on a peripheral edge 14r of each of the hole portion 14 falls within a range of 0.5 mm or more and 8.0 mm or less. This maximum length D is the distance (length) between two points that becomes maximum among the distances between any two points on the peripheral edge 14r. Specifically, in FIG. 6A, the shape of the hole portion 14 is a circular shape, and therefore, this maximum length D corresponds to the diameter of the hole portion 14.

Figure 6B:
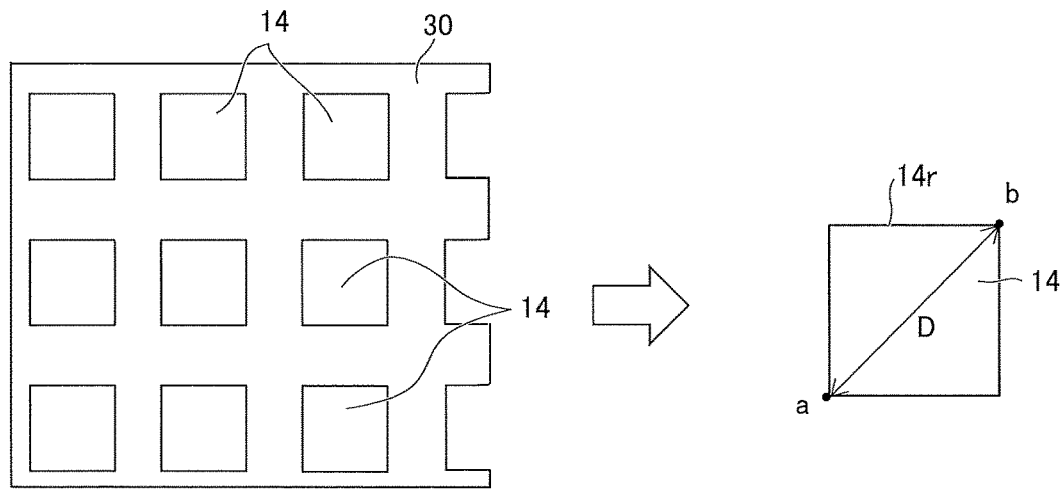
FIG. 6B is a schematic plan view for describing a shape of a hole portion according to a modification of FIG. 6A.

Note that, while in the embodiment, the shape of the hole portion 14 is the circular shape, it is not limited to this shape. For example, as illustrated in FIG. 6B, the shape of the hole portion 14 may be a rectangular shape, such as a square shape. Also in this case, it is only necessary that the above-described hole occupancy is satisfied, and the maximum length D corresponds to the length of a diagonal line of the rectangular, and therefore, it is only necessary that this length of the diagonal line satisfies the range of the above-described maximum length D.

Figure 6C:
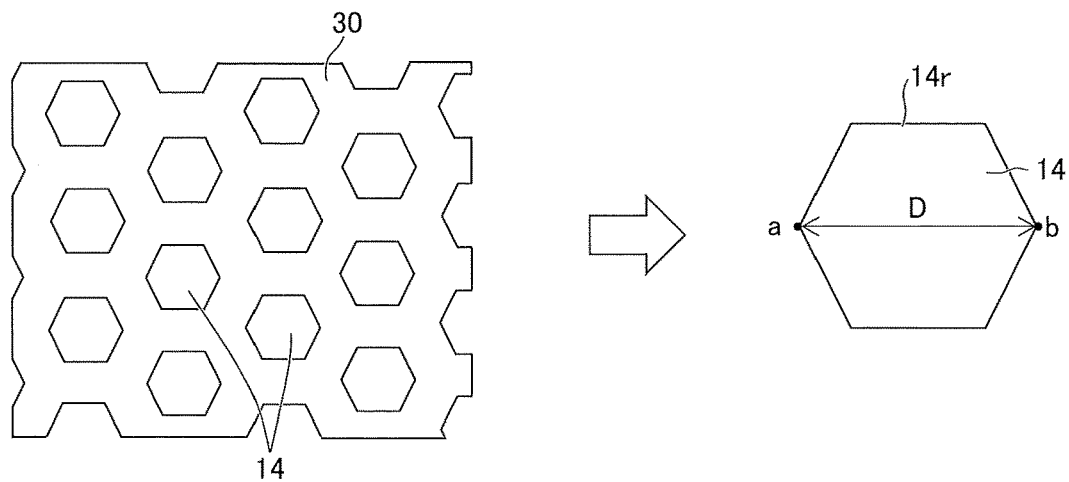
FIG. 6C is a schematic plan view for describing a shape of a hole portion according to a modification of FIG. 6A.

Other than this, as illustrated in FIG. 6C, the shape of the hole portion 14 may be a hexagonal shape. Also in this case, it is only necessary that the above-described hole occupancy is satisfied, and the maximum length D corresponds to the length illustrated in the drawing, and therefore, it is only necessary that this length satisfies the range of the above-described maximum length D.

Thus, with the embodiment, the electronic paper 10A having the light transmission region 10a in which the plurality of hole portions 14 are formed causes the light from outside the vehicle to be transmitted through the transparent electrode layer 20, the hole portions 14, and the protective layer 51 and to reach inside the vehicle regardless of presence/absence of a video of the electronic paper 10A. Thus, the light outside the vehicle is transmitted through the electronic paper 10A, and therefore, an occupant in the vehicle can see outside the vehicle from inside the vehicle.

On the other hand, a pedestrian and the like outside the vehicle can see a video of the electronic paper 10A displayed on the vehicle exterior. Since the pedestrian and the like outside the vehicle are in positions away from the light transmission region 10a of the electronic paper 10A compared with the occupant in the vehicle, satisfying the above-described hole occupancy and maximum length D of the hole portion 14 makes it difficult to see inside the vehicle via the hole portions 14 from the pedestrian and the like outside the vehicle. As the result, it is possible to suppress a cooped-up feeling felt by the occupant on board in the vehicle 1 while suppressing visibility inside the vehicle from outside the vehicle.

Here, for example, when the hole occupancy is less than 40%, the proportion of the hole portions 14 is excessively small, and therefore, it is difficult to see outside the vehicle from inside the vehicle. On the other hand, when the maximum length D is less than 0.5 mm, the maximum length D is excessively short, and therefore, it is difficult to see outside the vehicle from inside the vehicle via one hole portion.

On the other hand, when the hole occupancy exceeds 80%, the proportion of the hole portions 14 is excessively large, and therefore, it is easy to see inside the vehicle from outside the vehicle. Similarly, when the maximum length D exceeds 8.0 mm, the maximum length D is excessively long, and therefore, it is easy to see inside the vehicle from outside the vehicle due to the size increase depending on the shape of the hole portion 14.

Figure 5A:
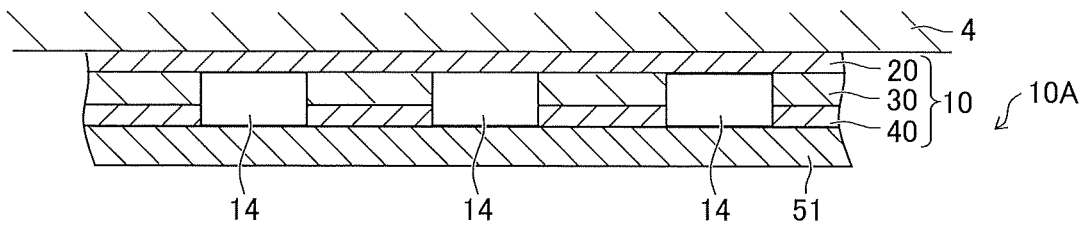
FIG. 5A is a schematic cross-sectional view in a state where the electronic paper according to the embodiment is installed on an outer panel.
Figure 5B:
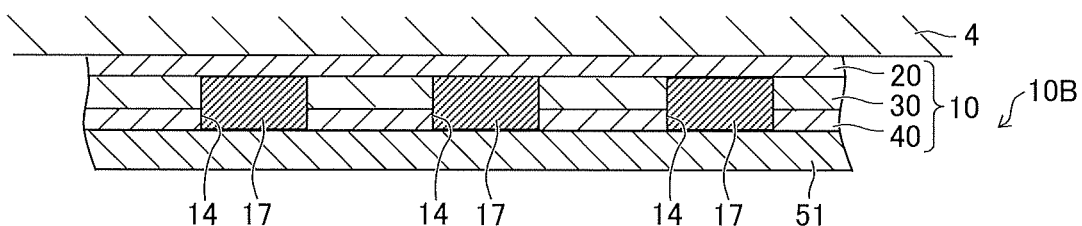
FIG. 5B is a schematic cross-sectional view in a state where an electronic paper according to a modification of FIG. 5A is installed on an outer panel.

Here, as illustrated in FIG. 5B, transparent members 17 may be disposed in the hole portions 14 formed in the electronic paper 10B (specifically, the electronic paper main body 10). The transparent member 17 ensures securing strength of the electronic paper 10B, and also ensures suppressing a contortion of the transparent electrode layer 20 and the display medium layer 30 of the electronic paper 10B caused by the hole portions 14 and a contortion of an image on the vehicle exterior viewed in the hole portions 14.

Figure 5C:
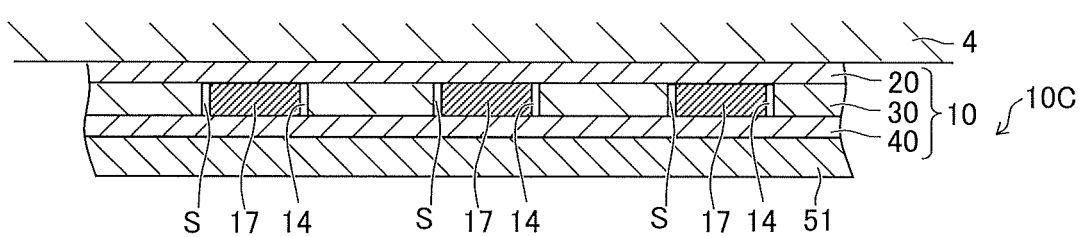
FIG. 5C is a schematic cross-sectional view in a state where an electronic paper according to a modification of FIG. 5B is installed on an outer panel.

Furthermore, when the transparent members 17 are disposed, as illustrated in FIG. 5C, clearances S may be formed between peripheral walls that forms the hole portions 14 and the transparent members 17 in a state where the electronic paper 10C is viewed in the thickness direction. Providing the clearance S between the peripheral wall of the hole portion 14 and the transparent member 17 ensures suppressing a deformation of the electronic paper 10C caused by a thermal expansion difference between the electronic paper 10C and the transparent member 17 when the electronic paper 10C is used.

Furthermore, in FIG. 5C, the rear electrode layer 40 is a transparent electrode layer. In this case, the hole portion 14b is not necessarily provided in the rear electrode layer 40 as illustrated in FIG. 3. Thus, each configuration of the electronic paper is not limited as long as the light is transmitted in both directions between inside of the vehicle and outside of the vehicle via the hole portion 14, and the occupant can visually perceive outside the vehicle from inside the vehicle.

Accordingly, the hole portion 14 may be a hole that opens on any one of the surfaces of the electronic paper, or may be a through hole that passes through the electronic paper.

Figure 5D:
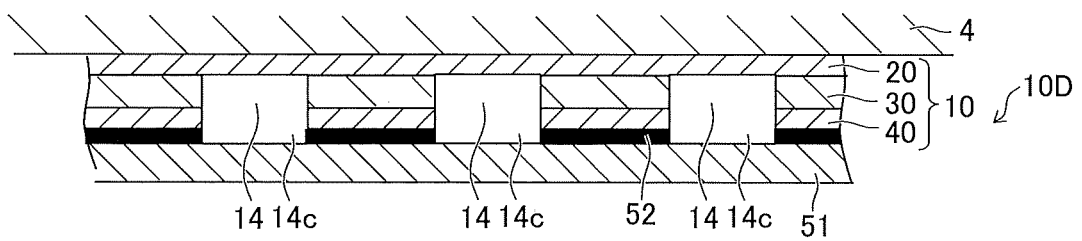
FIG. 5D is a schematic cross-sectional view in a state where an electronic paper according to a modification of FIG. 5A is installed on an outer panel.

Furthermore, as illustrated in FIG. 5D, a black colored film 52 having through holes 14c that partially form the hole portions 14 may be laminated on the rear electrode layer 40 such that the surface on the vehicle inner side of the electronic paper 10D is viewed as black. This makes the surface on the vehicle inner side of the electronic paper 10D black, and thus, the occupant can visually perceive the light transmitted through the hole portions 14 from outside the vehicle easily, and the outside of the vehicle can be easily seen from inside the vehicle. Other than this, for example, a light control film may be laminated instead of the black colored film.

Figure 7A:
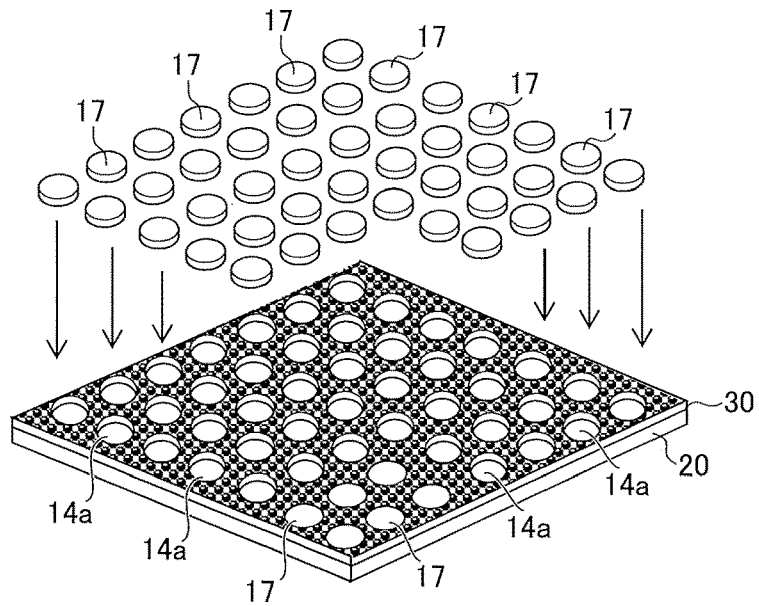
FIG. 7A is a schematic perspective view for describing a method for disposing transparent members in the hole portions of a display medium layer.
Figure 7B:
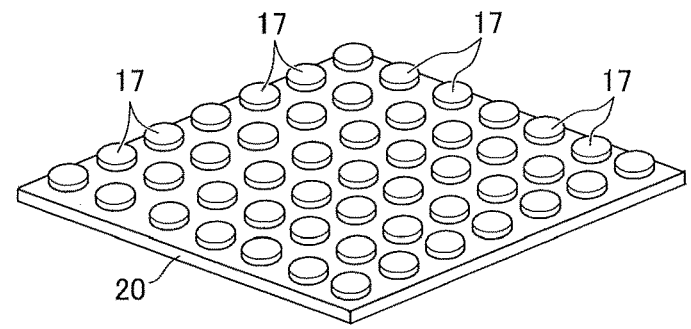
FIG. 7B is a schematic perspective view for describing a method for disposing the transparent members in the hole portions of the display medium layer in a method different from the method illustrated in FIG. 7A.
Figure 7B:
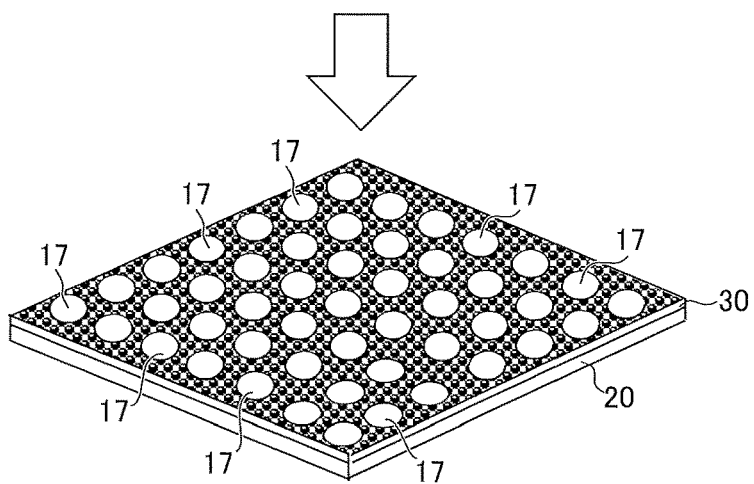

Such transparent members 17 can be, for example, arranged as illustrated in FIG. 7A or FIG. 7B. Specifically, as illustrated in FIG. 7A, for example, the transparent members 17 in circular plate-shapes corresponding to the shapes of these hole portions 14a may be inserted in the hole portions 14a formed in the display medium layer 30 in a state where the transparent electrode layer 20 and the display medium layer 30 are laminated. In this case, inserting the circular plate-shaped transparent member 17 having an outer diameter smaller than an inner diameter of the hole portion 14a ensures forming the clearance S illustrated in FIG. 5C.

A transparent resin may be filled in the hole portion 14a formed in the display medium layer 30 using a squeegee or the like in a state where the transparent electrode layer 20 and the display medium layer 30 are laminated. Other than this, the transparent member 17 may be formed by printing a transparent resin by ink-jet printing or the like toward the hole portion 14a. In this case, printing inner side with respect to the inner diameter of the hole portion 14a ensures forming the clearance S illustrated in FIG. 5C.

Meanwhile, as illustrated in FIG. 7B, for example, the circular plate-shaped transparent member 17 is preliminarily molded by heat pressing, injection molding, printing, or the like on the surface of the transparent electrode layer 20. Next, the display medium layer 30 may be formed by filling an ink of the microcapsule 31 so as to fill the clearances between these transparent members 17 on the surface using the squeegee and the like.

Thus, with the methods exemplarily illustrated in FIG. 7A and FIG. 7B, a flatness of the surface of the transparent member 17 is easily ensured, and thus, a contortion on the surface of the electronic paper caused by the transparent member 17 and the hole portion 14a can be suppressed, thereby ensuring a suppressed contortion of a video displayed on the electronic paper.

Here, while in the embodiment illustrated in FIG. 1, the light transmission region 10a is disposed on the whole surfaces of the electronic papers 10A to 10D, for example, the light transmission region 10a may be partially disposed. The region other than the light transmission region 10a of the electronic paper may be a region without providing the hole portion 14a described above, or may be a region having a hole portion that fails to satisfy the hole occupancy and the maximum length of the hole portion as described above. For the range of the light transmission region 10a relative to the electronic paper, its range is not specifically limited as long as the occupant can see outside the vehicle.

Figure 8A:
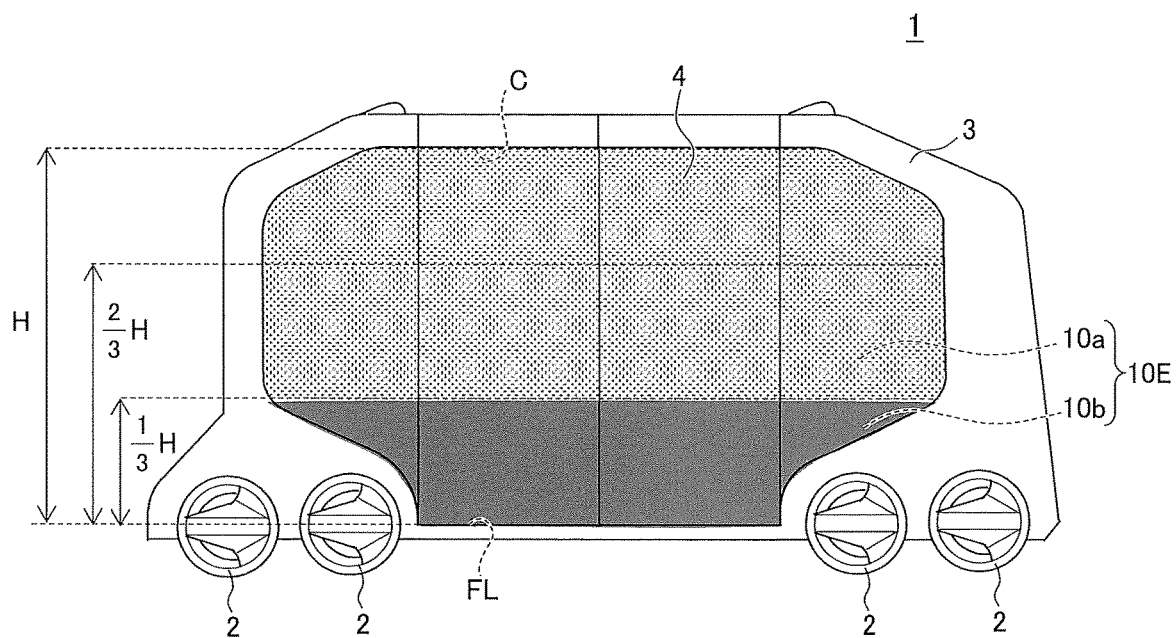
FIG. 8A is a side view of a vehicle including a vehicular display according to a modification of the embodiment illustrated in FIG. 1.
Figure 8B:
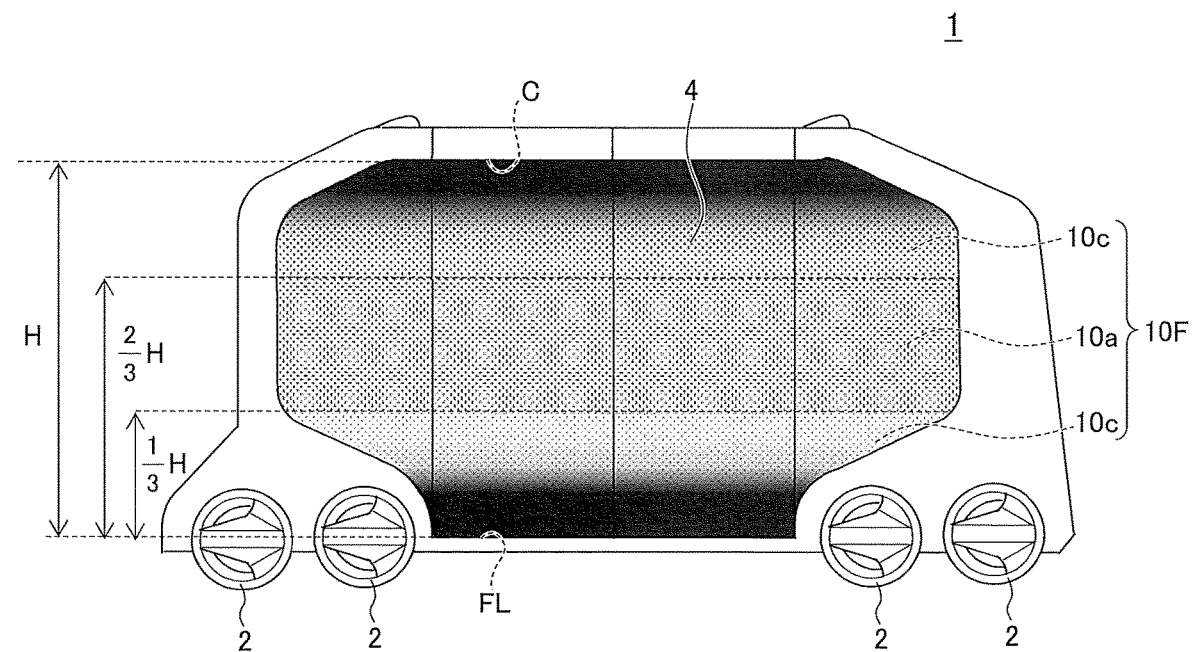
FIG. 8B is a side view of a vehicle including a vehicular display according to another modification of the embodiment illustrated in FIG. 1.

However, in some embodiments, as illustrated in FIG. 8A and FIG. 8B, the light transmission region 10a of the electronic papers 10E and 10F may at least include a range from a height of $\frac{1}{3} \times H$ to a height of $\frac{2}{3} \times H$ with respect to the floor FL when the distance from the floor FL in the vehicle interior of the vehicle 1 to the ceiling C in the vehicle interior of the vehicle 1 is L.

In FIG. 8A, the light transmission region 10a is in a range from the height of ⅓×H to a height of the ceiling C with respect to the floor FL. An adjacent region 10b (lower region of the light transmission region 10a) from the floor FL to the height of ⅓×H adjacent to the light transmission region 10a is a non-light transmission region that does not have the hole portion 14.

The range from the height of ⅓×H to the height of ⅔×H with respect to the floor FL is close to a position of an eye line when the occupant inside the vehicle sees outside the vehicle. In view of this, as illustrated in FIG. 8A, while suppressing visibility inside the vehicle from outside the vehicle by causing at least such a range to serve as the light transmission region 10a, the occupant can easily see outside the vehicle, thereby ensuring a further suppressed cooped-up feeling felt by a person in the vehicle.

Accordingly, the light transmission region 10a illustrated in FIG. 8A may be made to fall within the range from the height of ⅓×H to the height of ⅔×H with respect to the floor FL, and the adjacent region (upper region of light transmission region) from the height of ⅔×H to the height H of the ceiling C with respect to the floor FL, adjacent to this light transmission region 10a, may be made to be the non-light transmission region that does not have the hole portion 14.

Furthermore, in FIG. 8A, the electronic paper 10E is sectioned into the light transmission region 10a and the non-light transmission region (the adjacent region 10b) that is adjacent to the light transmission region 10a. However, for example, as illustrated in FIG. 8B, the above-described hole portion 14 may further be formed in an adjacent region 10c adjacent to the light transmission region 10a, and as distancing away from the light transmission region 10a (approaching the ceiling C or the floor FL from the light transmission region 10a), the occupancy of the hole portions 14 may be decreased. Thus, as the aspect that decreases the occupancy of the hole portions 14, for example, spaces between the hole portions 14 in the adjacent region 10b may be increased, or the sizes of the hole portions 14 may be decreased as distancing away from the light transmission region 10a. This ensures making a boundary between the light transmission region 10a and the adjacent region 10b caused by the hole portions 14 unnoticeable.

Figure 8C:
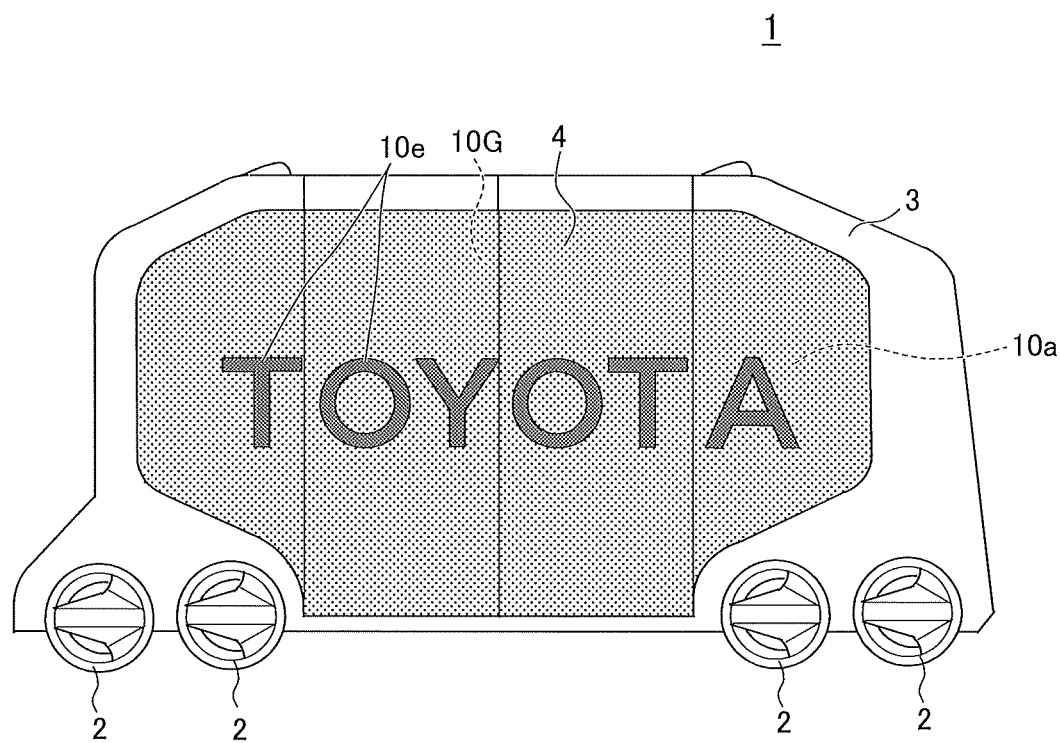
FIG. 8C is a side view of a vehicle including a vehicular display according to another modification of the embodiment illustrated in FIG. 1.

Furthermore, as illustrated in FIG. 8C, the whole surface of an electronic paper 10G may serve as the light transmission region 10a, and the light transmission region 10a may have a display region 10e that corresponds to a character shape. A hole occupancy of the hole portions 14 in this display region 10e differs from the hole occupancy in the light transmission region 10a other than the display region 10e. For example, the hole occupancy of the hole portions 14 in the display region 10e may be high compared with the hole occupancy in the light transmission region 10a other than the display region 10e, or the hole occupancy of the hole portions 14 in the display region 10e may be low compared with the hole occupancy in the light transmission region 10a other than the display region 10e.

For example, in the embodiment, pitches of the hole portions 14 in the display region 10e is narrower than pitches of the hole portions 14 in the light transmission region 10a other than the display region 10e. In addition to this, the sizes of the hole portions 14 in the display region 10e may be smaller than the sizes of the hole portions 14 in the light transmission region 10a other than the display region 10e. With such a configuration, the character of the display region 10e can be visually perceived clearly by the light transmitted through the hole portions 14 in the light transmission region 10a from inside the vehicle, for example, in the night time.

REFERENCE EXAMPLE

Figure 9:
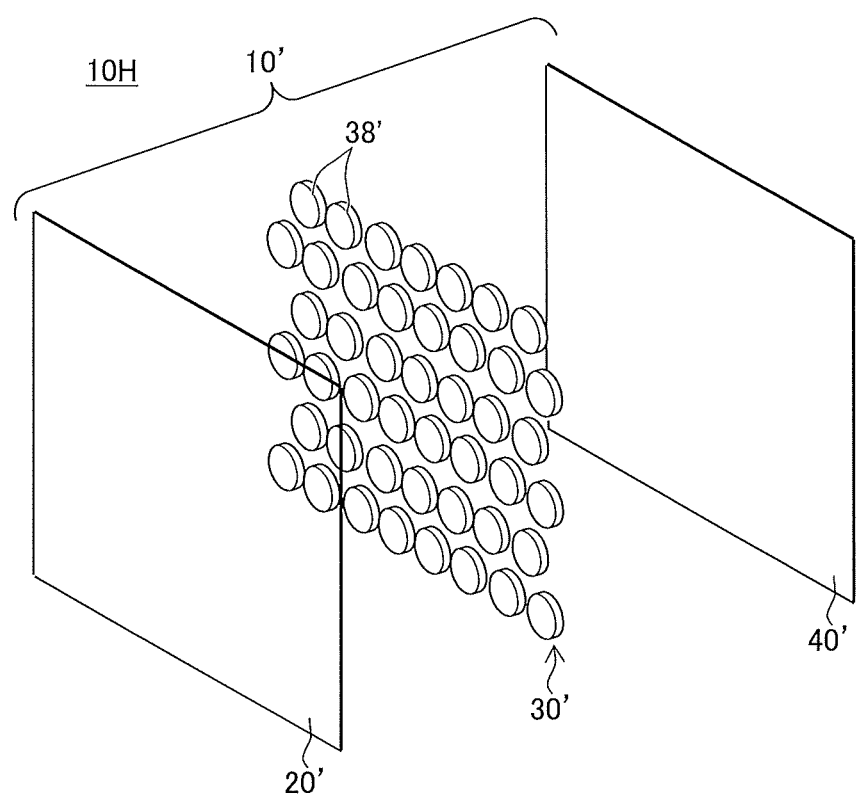
FIG. 9 is a main part enlarged cross-sectional view of an electronic paper main body according to a reference example.

The following describes an electronic paper main body 10' in a light transmission region of an electronic paper 10H according to a reference example. In FIG. 3, providing the hole portions 14a and 14b in the display medium layer 30 and the rear electrode layer 40 of the electronic paper main body 10 forms the hole portions 14 in the electronic paper 10A. However, in the electronic paper 10H according to this reference example, a display medium layer 30' of the electronic paper main body 10' is a layer having a plurality of island shaped or point shaped portions. In the reference example illustrated in FIG. 9, the display medium layer 30' is a layer in which a plurality of circular plate-shaped portions 38' are mutually separated. The circular plate-shaped portions 38' of the display medium layer 30' are arranged so as to be dispersed between a transparent electrode layer 20' and a rear electrode layer 40'. As illustrated in FIG. 9, the transparent electrode layer 20' and the rear electrode layer 40' are layers that do not have the hole portions, and the transparent electrode layer 20' and the rear electrode layer 40' are transparent layers.

Figure 4:
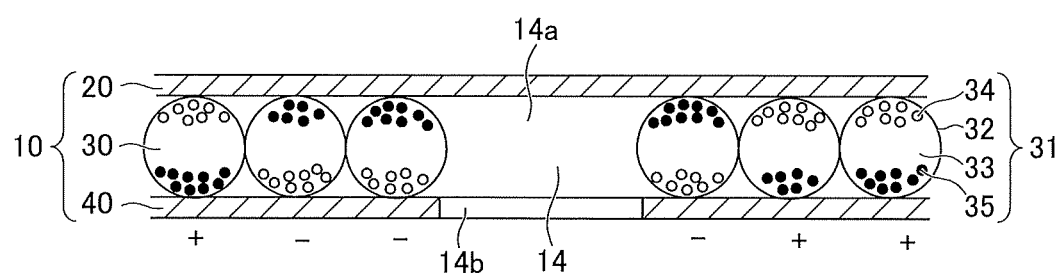
FIG. 4 is a main part enlarged cross-sectional view of the electronic paper main body illustrated in FIG. 3.

Each of the circular portions 38' of the display medium layer 30' is a portion in which the microcapsules 31 illustrated in FIG. 4 are spread over. Disposing the plurality of circular plate-shaped portions 38' between the transparent electrode layer 20' and the rear electrode layer 40' forms the hole portions (void portions) between each of the circular portions 38'. Use of the electronic paper 10H that includes the electronic paper main body 10' of the reference example ensures visibility outside the vehicle from inside the vehicle via the hole portions (void portions) between the transparent electrode layer 20' and the rear electrode layer 40'. On the other hand, while a video of the electronic paper 10H can be displayed on the vehicle exterior, since the pedestrian and the like outside the vehicle are in positions away from the light transmission region of the electronic paper 10H compared with the occupant inside the vehicle, the inside of the vehicle is difficult to see via the hole portions (void portions) from outside the vehicle.

One embodiment of the present disclosure has been described in detail above, the present disclosure is not limited to the above-described embodiment, and can be subjected to various kinds of changes of design without departing from the spirit of the present disclosure described in the claims.

Note that, while in the embodiment, the shape of the hole portion is a circular shape, a rectangular shape, or a hexagonal shape, it may be a polygon other than the rectangular shape or the hexagonal shape, or an oval shape as long as the light can be transmitted through the electronic paper, and its shape is not specifically limited. Furthermore, while in FIG. 8C the display region is the region that corresponds to the shape of the character, for example, the display region may be a region that corresponds to a shape of a graphic, or a display region including a character and a graphic, such as a logo. Furthermore, the display region illustrated in FIG. 8C may be applied to the electronic papers in FIG. 8A and FIG. 8B.

What is claimed is:

1. A transparent vehicular display arranged on a transparent outer panel of a vehicle, the vehicular display comprising an electronic paper that displays a video on a vehicle exterior,
wherein the electronic paper is provided with a plurality of hole portions to have at least a light transmission region through which a light is transmitted completely through the transparent vehicular display to inside the vehicle such that a passenger in the vehicle is able to see outside the vehicle through the transparent vehicular display,
a transparent member disposed in the hole portion with an empty clearance formed between a wall surface that forms the hole portion and the transparent member, the clearance being dimensioned to accommodate different thermal expansion properties between the hole portion and the transparent member,
wherein, in a state where the electronic paper is viewed in a thickness direction, a hole occupancy as a ratio of an area of the plurality of hole portions to a whole area of the light transmission region falls within a range of 40% or more and 80% or less, and a maximum length that connects two points on a peripheral edge of each of the hole portions falls within a range of 0.5 mm or more and 8.0 mm or less.

2. The transparent vehicular display according to claim 1, wherein the electronic paper has an adjacent region adjacent to the light transmission region, the hole portion is further formed in the adjacent region, and, as distancing away from the light transmission region, an occupancy of the hole portion in the adjacent region decreases.

3. The transparent vehicular display according to claim 1, wherein, when a distance from a floor in a vehicle interior of the vehicle to a ceiling in the vehicle interior of the vehicle is H, the light transmission region at least includes a range at least from a height of $\frac{1}{3} \times H$ to a height of $\frac{2}{3} \times H$ with respect to the floor.

4. The transparent vehicular display according to claim 1, wherein the light transmission region has a display region that corresponds to a shape of a character or a graphic, and a hole occupancy of the display region differs from a hole occupancy of the light transmission region other than the display region.

5. A transparent vehicle comprising:
the display according to claim 1 on the outer panel.

* * * * *